United States Patent [19]

Livingston

[11] 3,738,507

[45] June 12, 1973

[54] BIN FOR ACCUMULATING SPHERICAL ARTICLES

[75] Inventor: Clarence N. Livingston, Claremont, Calif.

[73] Assignee: Sunkist Growers, Inc., Sherman Oaks, Calif.

[22] Filed: Sept. 13, 1971

[21] Appl. No.: 179,738

[52] U.S. Cl.................... 214/16 R, 193/7, 193/32
[51] Int. Cl............................................. B65g 65/40
[58] Field of Search................. 214/17 R, 16 R; 193/7, 32; 198/54, 56; 222/556

[56] References Cited
UNITED STATES PATENTS

| | | | |
|---|---|---|---|
| 1,886,295 | 11/1932 | Morris | 193/32 X |
| 2,312,450 | 3/1943 | Smith | 193/32 X |
| 3,590,981 | 7/1971 | Adrian | 193/7 |
| 1,157,019 | 10/1915 | McCabe | 193/32 |

FOREIGN PATENTS OR APPLICATIONS

| | | | |
|---|---|---|---|
| 841,422 | 6/1952 | Germany | 214/17 R |

Primary Examiner—Robert G. Sheridan
Attorney—William K. Quarles

[57] ABSTRACT

An accumulator bin for substantially spherical articles which spaces the bin delivery gate from the point of application of the accumulated articles to utilize the natural angle of repose of the articles to deliver a single layer of articles at the point of application. Bridging at the delivery gate is retarded by a certain dimensional gate opening relative to the diameter of articles accumulated along with pressure relieving baffles strategically placed.

8 Claims, 4 Drawing Figures

PATENTED JUN 12 1973

INVENTOR
CLARENCE N. LIVINGSTON
BY
William K. Quarles, Jr.
ATTORNEY

INVENTOR
CLARENCE N. LIVINGSTON
BY
William K. Quarles, Jr.
ATTORNEY

BIN FOR ACCUMULATING SPHERICAL ARTICLES

This invention pertains to an accumulator bin for substantially spherical articles which is adapted to release the accumulated articles in a controlled, continuous manner.

Prior art accumulator bins are typically filled from the top and have an opening for releasing the contents near its lower reaches. The means for releasing the contents is ordinarily in the form of a gate or the like, such that the contents spill-out in random fashion once the gate is opened. Oft-times the contents tend to wedge or bridge about the opening such that it is blocked and the flow of accumulated articles from the bin is interrupted.

The accumulator bin of my invention has the advantage that it delivers or releases a pile of substantially spherical articles such as oranges, grapefruit or the like onto a conveyor or other point of application in a single layer.

It is a further advantage of my invention that it will deliver spherical articles from a bin without the articles bridging or otherwise tending to plug the outlet of the bin.

It is a further advantage of my invention to provide a means for protecting the articles from physical damage as they fall from a feed conveyor into the accumulator bin.

The controlled release of the instant invention is effected by utilizing the natural angle of repose of the particular contents in the bin. The articles are released through a gate spaced from the conveyor or other point of application a distance such that the natural angle of repose of the articles tends to deliver the articles in a single layer at the point of application.

Bridging or plugging of the delivery gate of the bin is retarded by the combination of an inclined floor panel, a gate opening set at a certain height relative to the size of the accumulated articles and removal of the pressure from the weight of the accumulated articles from the articles near the delivery gate.

Damage to articles being accumulated due to their fall into the bin is eliminated by certain closely spaced baffle members.

BRIEF DESCRIPTION OF THE DRAWING

Referring now to FIG. 1, reference numeral 20 refers generally to the accumulator bin of my invention. It is shown in a fragmentary fashion as any number of similar outlets may be added by extending the bin toward the right hand portion of FIG. 1.

Figure 1:
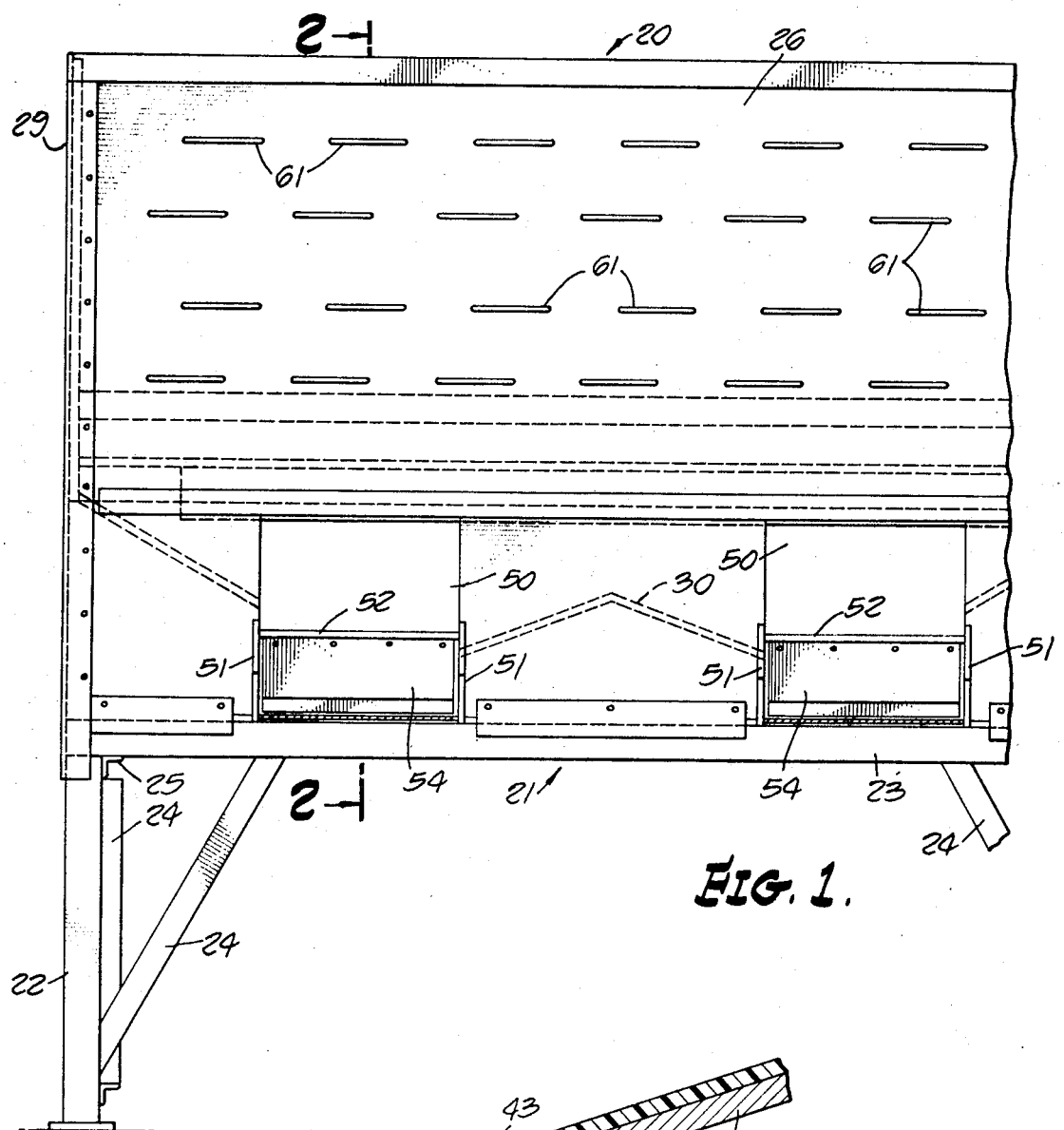
FIG. 1 is a fragmentary front elevation view of the accumulator bin of my invention showing two release orifices.

Accumulator bin 20 is mounted upon a frame designated generally as 21 which basically consists of legs 22 and cross members 23 secured by supporting strut 24 and base member 25. The frame components as shown in the drawing are fabricated of typical steel stock and may be secured in the usual manner by bolts, welding, etc. The frame structure is not critical and may be constructed of other materials such as wood and the like and connected together in the typical fashion recognized in the art for those materials.

Figure 2:
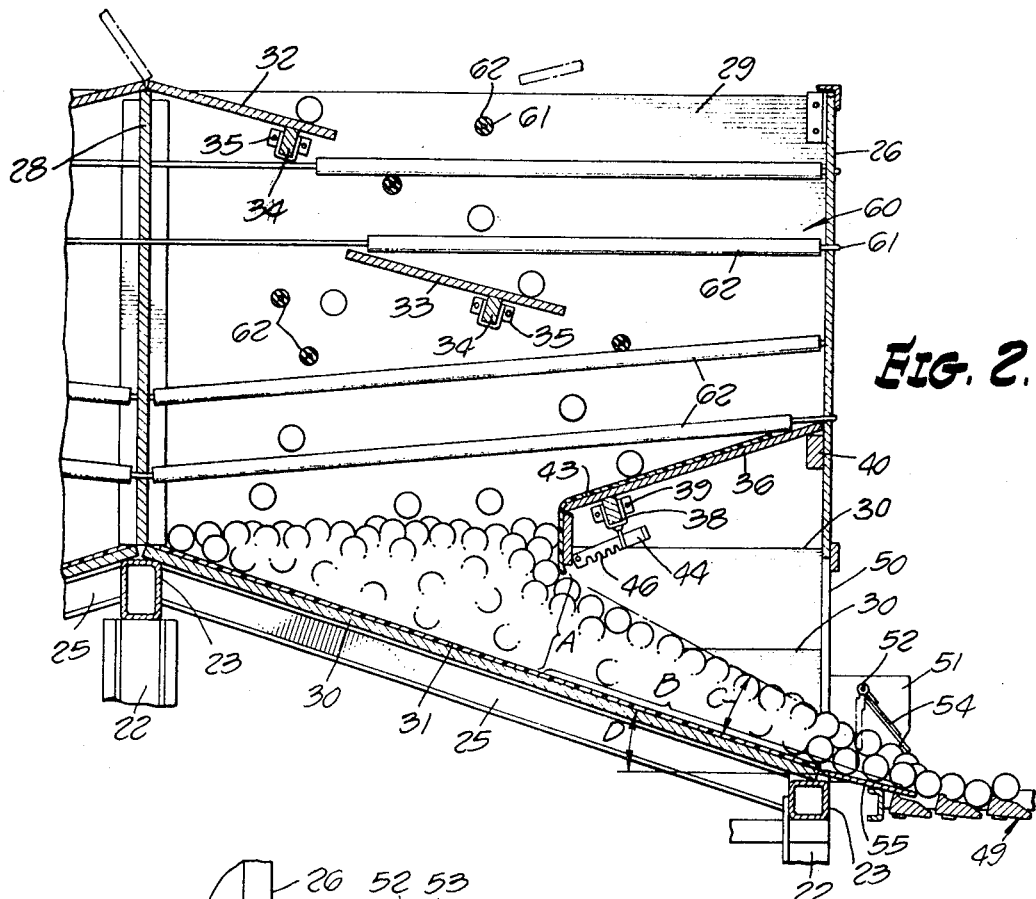
FIG. 2 is a fragmentary side elevation view of the accumulator bin taken on lines 2—2 of FIG. 1.

Referring now to FIG. 2, the accumulator bin includes front panel 26, rear panel 28, side panels 29 and floor panel 30. The panels may be constructed of any suitable material such as ¼ inch plywood. Floor panel 30 is covered with a flexible pad of a rubber or plastic material 31 to serve as a cushioning agent for the articles to be accumulated and dispensed.

Referring again to FIG. 2, baffle boards 32 and 33 extend longitudinally between the side panels of the accumulator bin and are secured in a stepped relation to cross members 34, of wood or the like, which are in turn secured to the side panels 29 by suitable brackets 35.

Baffle board 36 is angularly inclined relative to baffle boards 32 and 33 and is supported at its lower end by cross member 38 which is secured to side panels 29 by suitable brackets 39. Cross member 40, secured in any appropriate manner to front panel 26, supports the upper-most end of baffle board 36.

Figure 4:
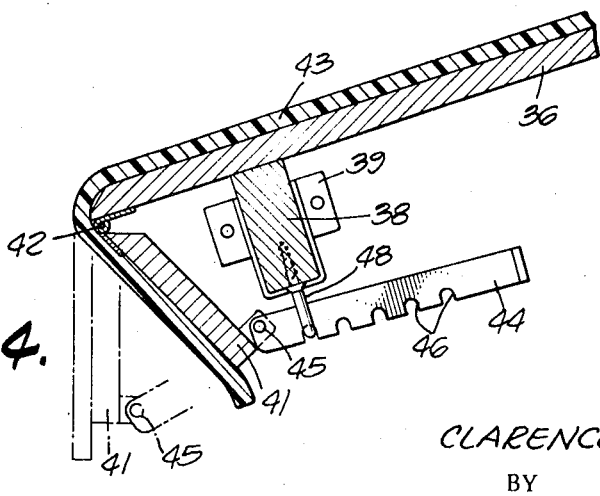
FIG. 4 is a fragmentary side elevation view of the lower baffle board and gate of FIG. 2 shown in more detail.

Referring now to FIG. 4, gate 41 is hingedly mounted to the lower-most end of baffle board 36 as at 42. Gate adjustment handle 44 is pivotally attached to the lower-most end of gate 41 as at 45. The handle 44 includes cut-outs 46 designed to cooperate with hook 48 screwed into cross member 38. By lifting handle 44 and moving it forward or backwards, the gate means 41 can be swung into the position shown in FIG. 4 to the position shown in the phantom lines in FIG. 4 to increase or decrease the size of the opening A (see FIG. 2). Baffle board 36 and gate 41 are covered with a flexible pad 43 of a rubber or plastic material to serve as a cushioning agent for the articles to be accumulated and dispensed.

Figure 3:
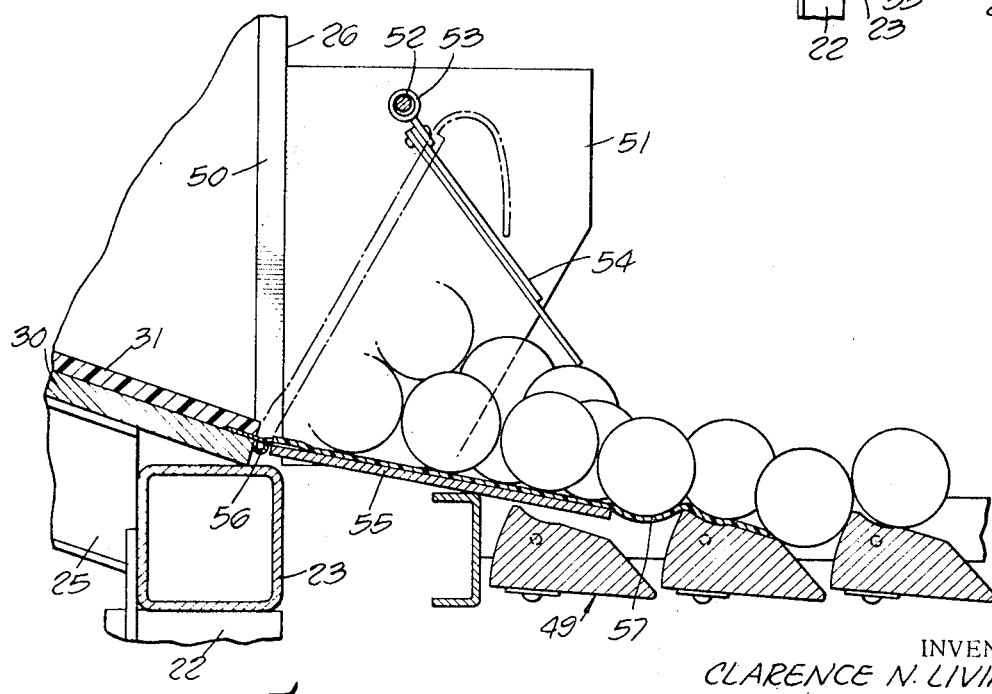
FIG. 3 is a fragmentary end elevation view of the lower-most portion of the accumulator bin as shown in FIG. 2.

In FIGS. 2 and 3, reference numeral 49 refers generally to a walking board conveyor of the type described in co-pending patent application Ser. No. 132,444, filed Apr. 8, 1971 to which it is desired to deliver in a single layer, articles to be conveyed.

Referring to FIG. 1, the disclosed accumulator bin includes a plurality of openings 50 through which accumulated articles are delivered from the accumulator bin. Adjacent each side of end opening 50, is a vertical support 51 which extends outwardly from front panel 26.

Drag support bar 52 is mounted at each end to a support 51. Flexible drag 54 is pivotally mounted on drag support bar 52 by means of a ring-shaped fitting 53 which hangs therefrom (see FIG. 3) for a reason to be hereinafter described.

Bridge member 55 is hingedly attached to the lower-most edge of floor panel 30 as at 56. It serves to maintain a continuous surface over which the articles may roll between the end of floor panel 30 and a conveyor means such as 49. To halt or cease the flow of articles from the bin, bridge member 55 may also be swung upwardly to the position shown by the phantom lines in FIG. 3 in order to act as a gate. Flexible pad 57 of plastic, leather or the like may be added to the upper surface of bridge member 55 to serve as an extension of bridge member 55 when the conveyor being fed is of the walking-board type thus retarding blocking of the fruit at the front edge of the conveyor.

Rope baffles, designated generally as 60, attached to the various wall members of the accumulator bin extend between baffle boards 32. Rope baffles 60 comprise nylon ropes 61 surrounded by foam pipe insulation 62. Nylon ropes 61 are threaded through holes drilled in the front and side panels as shown in FIGS. 1 and 2. They are spaced such that articles falling into the bin will continuously bounce from baffle to baffle during their fall thus preventing a sufficient build-up momentum to damage the article as it hits the bottom of the bin.

In operation, articles to be accumulated are delivered from a conveyor (not shown) along the upper periphery or rear wall panel 28 of the accumulator bin and directed into the accumulator bin. They roll along the upper-most baffle board 32 and down into the bin with the fall broken through contact with rope baffles 60 and baffle boards 32 and 36, thus preventing damage to the articles.

As the articles accumulate in the bin, bridge 55 is ordinarily in the up position shown by the phantom lines in FIG. 3. When the bridge 55 is in this position, it acts as a gate thus closing off the lower opening of the accumulator bin so that articles will accumulate in the bin. When it is desired to feed articles from the bin, a conveyor such as at 49 is placed adjacent opening 50 and bridge member 55 is then dropped down to the lower position shown in FIG. 3 thus allowing the articles to roll or gravitate from the bin to the conveyor.

Floor panel 30 and the lower edge of gate member 41 define an orifice A (see FIG. 2) through which the accumulated fruit gravitates toward the conveyor. The dimensional relationship between the orifice opening A and the distance B (the distance between the orifice A and the point of application, i.e., the edge of the conveyor) may therefore be set such that the natural angle of repose C of the particular articles accumulated result in a single layer of fruit being delivered to the conveyor or other point of application adjacent the lower-most edge of floor panel 30.

Obviously distance B is substantially fixed with any particular installation. Therefore, to accommodate articles of greater or lesser diameter and thus a greater or lesser angle of repose, orifice A may be varied by adjusting the position of gate member 41. This is done by lifting adjustment handle 44 and setting it in any of the various cut-outs 46 provided. The proper gate setting is determined rapidly by trial and error for any particular article.

Flexible drag 54 of a heavy leather or rubber material, etc., may be provided to drag along the tops of articles transferred to the conveyor to aid in spacing the articles to insure that a single layer of fruit is delivered to the conveyor. Although desirable in some instances, the drag is not absolutely necessary to the utility of the accumulator bin.

It will be seen from the placement of the baffle boards 32 and 36 that as the bin fills, the baffle boards will carry or bear a great deal of the pressure of the accumulated articles such that the weight of the articles does not bear upon the articles leaving or flowing from the bin beneath baffle board 36. When accumulating oranges, grapefruit and the like, I have thus found the baffle board 36 positioned in this manner will bear the weight of the accumulated fruit above the exit gate 50 thus tending to reduce the tendency of the fruit to bridge at the exit gate.

I have further found that angle D, i.e., the angle floor panel 30 makes with the horizontal (see FIG. 2) affects the flow of fruit from the bin. If this angle is maintained at approximately 18° and distance A is maintained at approximately three times the diameter of the fruit, a free-flowing tendency results with virtually no bridging at opening 50.

Rear wall panel 28 may serve as a common rear panel with an identical accumulator bin as shown at the extreme left-hand portion of FIG. 2. When two bins are thus positioned in this back-to-back manner, they can be supplied from a common conveyor above rear wall 28.

My description in specific detail of the presently preferred embodiment of the invention will suggest various changes, substitutions, and other departures from my disclosure within the spirit and scope of the appended claims.

I claim:

1. A bin for accumulating substantially spherical articles, said bin comprising:
   a. side walls;
   b. A floor panel inclined with respect to horizontal, said floor panel connected to the lower portion of said side walls to define an enclosure to accumulate articles, the lower-most edge of said floor panel adapted to be positioned adjacent a conveyor;
   c. gate means through which the accumulated articles may gravitate from said bin, said gate means mounted inwardly of said side walls and spaced from the lower-most edge of said floor panel such that the natural angle of repose of the accumulated articles gravitating from said gate means tends to deliver articles in a substantially single layer at said lower-most edge; and
   d. a rigid baffle extending inwardly of said side walls, said gate means mounted to the inward-most portion of said baffle, whereby said baffle relieves the pressure of accumulated articles from the articles gravitating through said gate means.

2. The bin of claim 1 wherein the opening of said gate means may be adjusted to accommodate articles of various diameters.

3. The bin of claim 1 further comprising a drag pad mounted above said floor panel outwardly of said gate means whereby said drag pad will drag along the top of the articles as they gravitate from said bin.

4. The bin of claim 1, further comprising a ramp means hingedly mounted to swing from a lower position whereby it bridges the gap between the lower-most edge of the floor panel and an adjacent conveyor to aid the free flow of articles from the bin to the conveyor, and an upper position whereby it blocks the flow of fruit from said bin.

5. The bin of claim 1, further comprising rigid baffles connected to said side walls in a staggered relation, said baffles adapted to block the free fall of fruit into said bin.

6. The bin of claim 1, further comprising flexible baffles arranged in horizontal staggered relationship to retard the free fall of articles into the bin.

7. The bin of claim 6 wherein said flexible baffles comprise rope strung between holes in said side walls.

8. The bin of claim 7 wherein said flexible baffles include a resilient jacket surrounding said rope.

* * * * *